Aug. 11, 1959  S. M. MOBERG  2,899,230
CORD SEAL AND METHOD OF MAKING THE SAME
Filed July 26, 1957  3 Sheets-Sheet 1
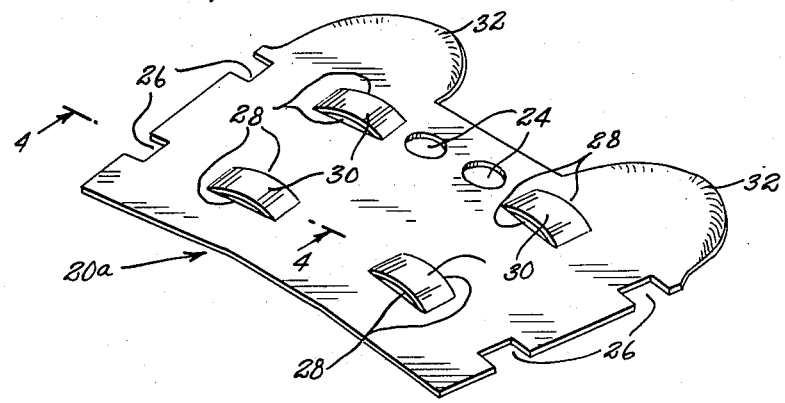
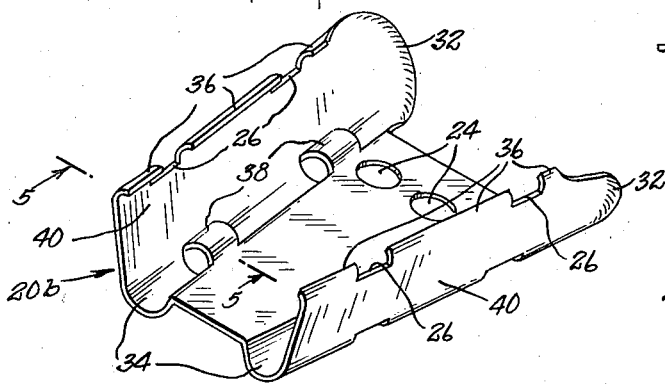
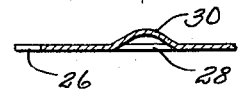
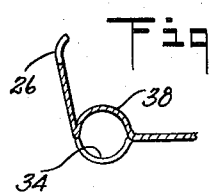
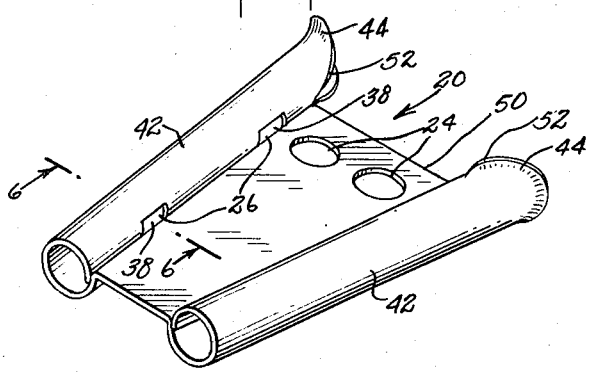
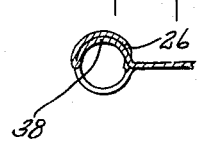
INVENTOR.
SIGURD M. MOBERG
BY
ATTORNEY Aug. 11, 1959 S. M. MOBERG 2,899,230
CORD SEAL AND METHOD OF MAKING THE SAME
Filed July 26, 1957 3 Sheets-Sheet 2
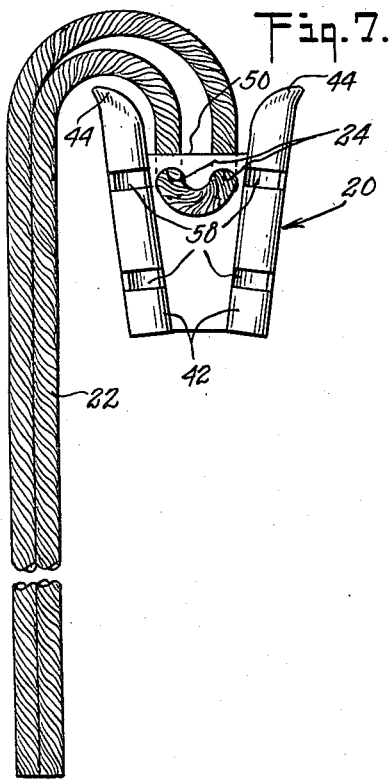
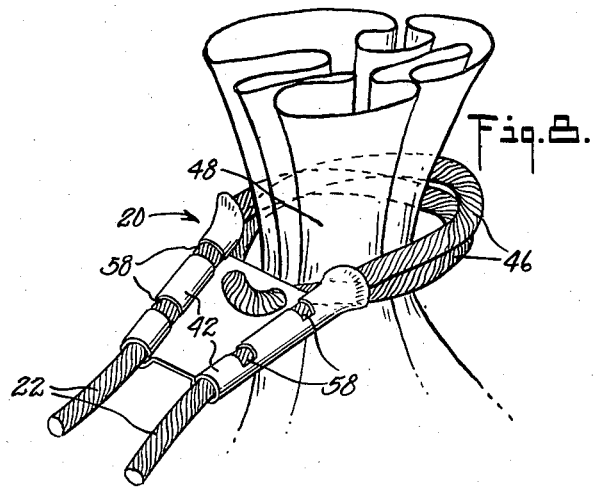
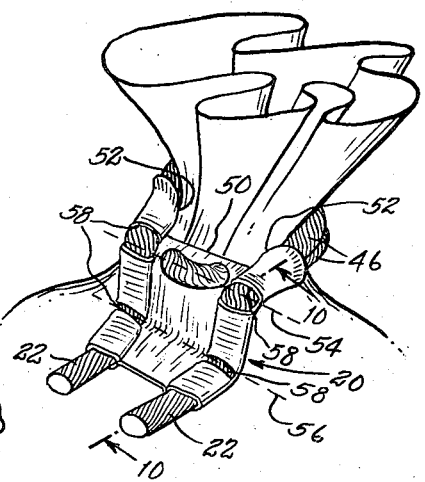
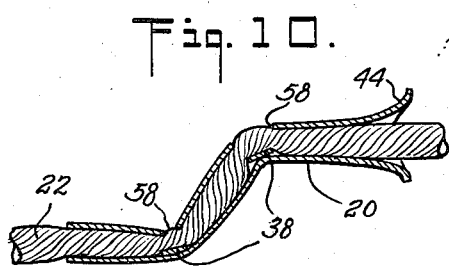
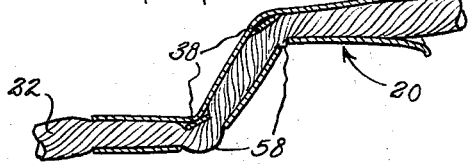
INVENTOR.
SIGURD M. MOBERG
BY
*Robert Henderson*
ATTORNEY

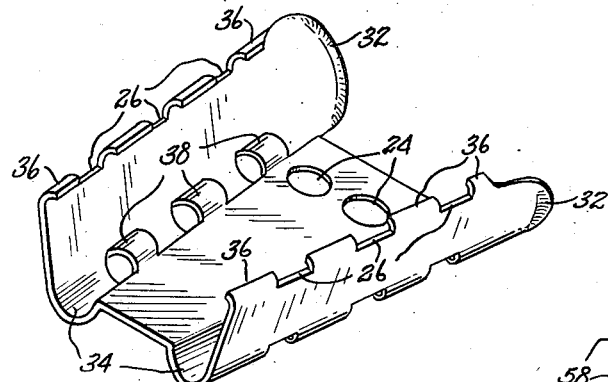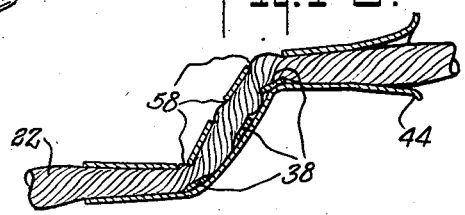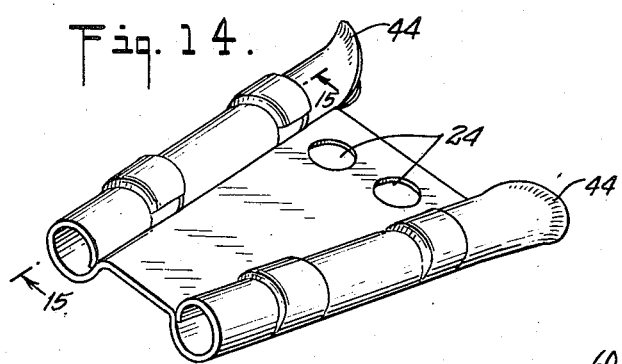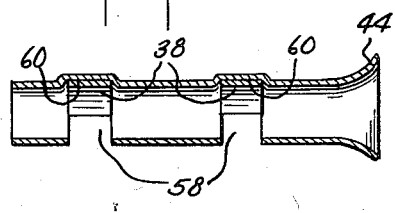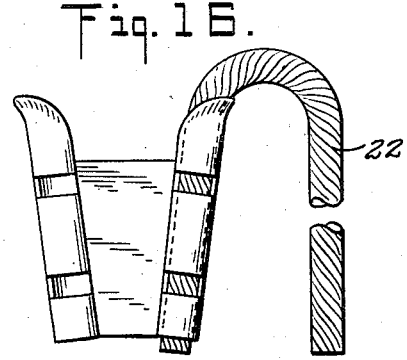
INVENTOR.
SIGURD M. MOBERG
ATTORNEY

United States Patent Office 2,899,230
Patented Aug. 11, 1959

2,899,230

CORD SEAL AND METHOD OF MAKING THE SAME

Sigurd M. Moberg, Pompton Plains, N.J., assignor to E. J. Brooks Company, Newark, N.J., a corporation of New Jersey Application July 26, 1957, Serial No. 674,370

7 Claims. (Cl. 292—325)

This invention relates to cord seals and method of making them and such a seal is disclosed herein as applied to the neck of a bag, for protecting the contents of the bag against pilfering.

An important object of this invention is the provision of an improved sheet-metal cord seal which can be manufactured more economically than prior seals designed for the same purposes.

Another important object is the provision of such a seal which may be applied, or sealed, upon a cord more easily than prior seals designed for the same purposes.

Another important object is the provision of such a seal of sheet metal which will effectively hold cord portions therewithin against all possibility of being pulled or slid out endwisely by interlopers.

Another important object is the provision of an improved method of making such a seal.

The foregoing and other more or less obvious objects are accomplished by this invention of which several embodiments are illustrated in the accompanying drawings without, however, limiting the invention to those particular embodiments.

In the drawings:

Figure 1 is a perspective view of a sheet-metal blank cut to shape and preliminarily, or initially, formed in practicing the method of this invention to produce a seal according to this invention.

Fig. 2 is a perspective view of said blank in an intermediate shape thereof.

Fig. 3 is a perspective view of said blank in its final form in the seal as delivered by the manufacturer to the user.

Figs. 4, 5 and 6 are fragmentary sectional views respectively, substantially on the lines 4—4 of Fig. 1, 5—5 of Fig. 2, and 6—6 of Fig. 3.

Fig. 7 is an elevational view of said seal, including a cord therefor, as delivered by the seal manufacturer to the user.

Fig. 8 is a perspective view of said seal in an early stage in its application to the neck of a bag which is fragmentarily shown.

Fig. 9 is a perspective view of said seal as completely applied to said bag neck.

Fig. 10 is a sectional view, substantially on the line 10—10 of Fig. 9.

Fig. 11 is a sectional view similar to Fig. 10 but showing the approximate relationship of the parts of the seal if the latter is applied invertedly as compared to Fig. 10.

Fig. 12 is a perspective view, much like Fig. 2, but illustrating a seal according to a second embodiment of the invention in an intermediate stage of its manufacture.

Fig. 13 is a sectional view, much like Fig. 10, of the seal of said second embodiment as completely applied, or clinched, upon a cord.

Fig. 14 is a perspective view of a sheet-metal sealing element of a seal according to a third embodiment of this invention.

Fig. 15 is a sectional view, substantially on the line 15—15 of Fig. 14.

Fig. 16 is an elevational view of a seal according to a fourth embodiment of this invention.

It will be understood that a seal according to this invention may be considered to consist of only a sheet-metal element capable of being sealed upon a cord or to consist of the combination of such a sheet-metal element and related cord.

The seal of the first embodiment of Figs. 1–11 comprises a sheet-metal sealing element 20 which, essentially, constitutes the seal, and may also be considered as including a cord 22 to which the element 20 is applied. The sheet metal employed is bendable but possessed of very little or no resiliency and is such as to enable the element 20 to be formed and crimped and to yield a device which cannot be opened without being broken. Sheet steel or aluminum, processed to impart the necessary characteristics, are mentioned as examples of metals which may be used.

The method of this invention involves the manner in which a plain, flat piece of suitable sheet metal is shaped and formed through the forms shown in Figs. 1 and 2 to form shown in Fig. 3 to provide the sealing element 20.

A plain piece of sheet metal, as a first stage in this method, is first cut and deformed by suitable cutting and forming dies to the shape of a partially formed blank 20a, as shown in Fig. 1. This processing of the sheet metal leaves it, for the most part, flat with two cord holes 24 and four peripheral notches 26 therein, and, in line with such notches at opposite sides of the blank, pairs of transverse slits 28 are cut in the metal and the intervening metal is pushed upwardly and stretched slightly to form bridges 30. At the same stage, upper, semi-circular marginal portions are flared downwardly, as at 32.

As a second stage in the method, the partially formed blank 20a is bent from its Fig. 1 shape to its Fig. 2 shape as a further partially formed blank 20b, the principal changes in this transformation being the imposition of a pair of longitudinal, cross-sectionally almost semi-circular bends 34 and the slight bending in of opposite marginal portions 36. In this transformation, the bending dies that are used need not, and preferably do not, engage the portions constituting the bridges 30, but the formation of the bends 34 has the effect of shortening the distances between the ends of the slits 28 so that the bridges 30 assume a more pronounced curvature and thereby become transformed into loops 38 of approximately semi-circular shape in cross-section.

As a final stage in the method, upstanding side walls 40 of blank 20b are rolled in to form coiled cord receiving tubes 42 at opposite margins of the sealing element 20, as shown in Fig. 3. In this transformation, the loops 38 and the bends 34 stay substantially unchanged and the walls 40 become wrapped intimately about the loops 38. The notches 26 avoid any interference by the loops 38 in the formation of the tubes 42 or in some possible additional in-coiling of said tubes when the seal is crimped tightly upon a cord, as hereinafter explained. During the two transformations from blank 20a to sealing element 20, the flared portions 32 persist to provide outwardly flared tube ends 44 which facilitate threading of cord 22 into the tubes 42 and prevent the end edges of said tubes from cutting the cord when the seal is applied upon a bag.

The device, as supplied by the manufacturer to a user, preferably includes the cord 22, threaded through both holes 24, as shown in Fig. 7 to keep the cord associated with the sheet-metal sealing element 20; two holes being better than one for that purpose.

It may be understood from Fig. 8, that, in applying the seal to a bag neck, the user threads the cord ends emanating from each of holes 24 into the flared ends of the tubes 42 at opposite sides of the seal and through the tubes to form a pair of cord loops 46 to first encircle bag neck 48 loosely. These cord loops may be formed directly upon the back neck or may be preliminarily formed and then slipped over the bag neck. Then, the two ends of the cord 22 are pulled taut to tighten the loops 46 about the bag neck whereafter the sheet-metal element 20 is deformed or crimped with a suitable sealing tool to its condition, as shown in Fig. 9. In this condition an inner edge 50 of element 20, inner edges 52 of the flared ends of the tubes 42, and the cord loops 46 all bite into the bag neck 48 to prevent the seal from slipping off of the bag.

The sealing tool employed to crimp or deform the seal to its Fig. 9 condition may be either in the form of a machine suitably resting upon a table surface or of a well-known plier-type of tool which may be manipulated in the user's hand. Either arrangement preferably includes clinching dies which are forced together upon element 20 by operation of such a machine or tool in a manner well understood by those familiar with this art. Such dies are so formed as to bend the tubes 42 oppositely at two transverse lines at points 54 and 56, preferably coincident with opposite spaces 58 which are present in said tubes as a result of the described inwardly directed formation of the loops 38. The dies in such a machine or tool may be so formed as to impart some additional coiling-in of the tubes 42 before the transverse bending thereof, although such additional coiling is not essential. Such dies, however, are preferably adapted not only to impart the mentioned transverse bends but, also, to flatten out said tubes to some extent to enable them to more tightly close upon the cord.

The present improved seal, however, does not rely only on the mentioned transverse bending and flattening of the tubes 42 as means for locking the cord against withdrawal from the seal, but utilizes the metal loops 38 as very effective means against such withdrawal. It may be noticed that no part of the seal 20 has been characterized as its top. Even though the clinching machine, or clinching tool, may always impart the transverse bends in the same direction in relation to the bag, as shown in Fig. 9, it is immaterial which side of the seal is uppermost. Figs. 10 and 11 show the seal as applied in opposite or inverted positions from which it may be seen that in either of said positions the cord in each tube 42 always has a tendency to bulge outwardly through one of the spaces 58 and to be pinched within the other space 58 in the same tube. Also, it may be seen that in either of the inverted positions, the metal loops 38 press laterally into the cord and edges of said loops bite into the cord sufficiently to prevent endwise slippage of the latter without, however, cutting the cord.

The metal employed in the seal is such that even though bent and clinched as explained, it will not break unless one attempts to open the seal by unbending or uncoiling it. The normal way for an authorized person to open the bag would be to cut the cord loops 46. An attempt by an unauthorized person to open the bag by manipulation of the seal would either cause the seal to break or leave other plainly visible evidence of tampering.

The second embodiment, illustrated in Figs. 12 and 13, differs from the first embodiment only in having three loops 38 in each tube 42, the additional loop being so disposed as to be between the transverse bends in a clinched seal. The additional loops, of course, give additional assurance against unauthorized opening of the bag or other article on which the seal is used.

The third embodiment, illustrated in Figs. 14 and 15, differs from the first embodiment only in having internal depressions 60 within which the metal loops 38 may seat, or partially seat, in the seal as produced by the manufacturer. This seating, or partial seating, of the loops 38 removes the latter, at least to some extent, from the path of cord ends being threaded through the tubes of the seal and thereby facilitates such threading. However, when the seal is clinched and bent transversely, the loops 38 project into the cord and function as cord-gripping means, substantially in the manner already explained.

The fourth embodiment, illustrated in Fig. 16, differs from the first embodiment only in the omission of the two cord holes 24 and in that one end of the cord 22 is inserted into one of the tubes 42 at the factory, said one tube being coiled sufficiently, after insertion of the cord thereinto, to keep the cord from sliding out of said tube before the seal is clinched by the user's sealing machine, or sealing tool. Although, in such an arrangement, the said one tube may be coiled somewhat more tightly than the other tube by the seal manufacturer, the corded seal as delivered to the user may be clinched by dies of the same character as those used to clinch the seals of the other disclosed embodiments.

It should be apparent that the disclosed concepts may be utilized in various other ways to achieve the stated objects without, however, departing from the invention, as set forth in the following claims.

I claim:

1. A cord seal comprising a sheet-metal sealing element having opposite, marginal cord tubes each of which has an inwardly protruding, semi-cylindrical loop comprising a bridge of the sheet metal, pushed inwardly from one side of its related tube leaving a breach in the latter facilitating deformation of the tube, said loop in each tube being adapted to become partially embedded in a cord in such tube, when the latter is deformed, to hold the cord against endwise slippage in the tube.

2. A seal according to claim 1, said loop in each tube comprising a wall portion of the tube, which wall portion is of metal from between two transverse slits at one side of such tube, and is in reversely, inwardly bent condition and lies adjacent the opposite side of the tube.

3. A seal according to claim 1, each of said cord tubes having its loop in transverse alignment with said loop in the opposite tube, said sealing element being adapted to be bent transversely, in line with said loops in clinching a cord therewithin.

4. A seal according to claim 1, each of said cord tubes being formed with an internal recess into which each of said loops extends prior to the use of the seal.

5. A seal according to claim 1, each of said cord tubes having a plurality of such loops, each of said loops in each of said tubes being in transverse alignment with a corresponding one of said loops in the other of said tubes, and said sealing element being adapted to be oppositely bent transversely, in two places, coincident in each of said places with corresponding loops in the two tubes paired in such transverse alignment.

6. A seal according to claim 5, said plurality of loops in each of said cord tubes including a loop which is intermediate the locations of such transverse bending.

7. The method of making a cord seal comprising forming a pair of transverse slits in a sheet metal blank, pushing upwardly the metal between said slits to form an arcuate bridge, imposing in said blank a longitudinal bend of substantially semi-circular shape in cross-section, the concave side of said bend facing the concave side of said bridge and the opposite, longitudinal margins of said bend being substantially coincident with the ends of said slits whereby to shorten said bridge and its radius of curvature, and coiling a portion of the blank adjacent said semi-circular bend to form a tube wherein said bridge is disposed in intimate association with said coiled portion.

References Cited in the file of this patent

UNITED STATES PATENTS

| | | |
|---|---|---|
| 745,036 | Brooks | Nov. 24, 1903 |
| 1,537,741 | Brooks | May 12, 1925 |
| 1,631,464 | Brooks | June 7, 1927 |
| 2,108,512 | Reichenbach | Feb. 15, 1938 |
| 2,189,026 | Dietze | Feb. 6, 1940 |
| 2,480,543 | Brooks | Aug. 30, 1949 |
| 2,654,333 | Steinberg et al. | Oct. 6, 1953 |
| 2,758,865 | Brooks | Aug. 14, 1956 |
| 2,800,349 | Moberg | July 23, 1957 |

Dedication 2,899,230.—*Sigurd M. Moberg*, Pompton Plains, N.J. CORD SEAL AND METHOD OF MAKING THE SAME. Patent dated Aug. 11, 1959. Dedication filed Feb. 9, 1972, by the assignee, *E. J. Brooks, Company*.

Hereby dedicates to the Public the term thereof remaining after Oct. 1, 1970.

[*Official Gazette June 13, 1972.*]